(12) United States Patent
Awadallah et al.

(10) Patent No.: US 11,295,090 B2
(45) Date of Patent: *Apr. 5, 2022

(54) MULTI-SCALE MODEL FOR SEMANTIC MATCHING

(71) Applicant: Microsoft Technology Licensing, LLC, Redmond, WA (US)

(72) Inventors: Ahmed Hassan Awadallah, Redmond, WA (US); Miaosen Wang, San Jose, CA (US); Wei Wang, Bothell, WA (US); Madian Khabsa, Kirkland, WA (US); Xiao Yang, State College, PA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 38 days.

This patent is subject to a terminal disclaimer.

(21) Appl. No.: 16/859,329

(22) Filed: Apr. 27, 2020

(65) Prior Publication Data

US 2020/0257858 A1    Aug. 13, 2020

Related U.S. Application Data

(63) Continuation of application No. 15/956,585, filed on Apr. 18, 2018, now Pat. No. 10,664,662.

(51) Int. Cl.
*G06F 40/30* (2020.01)
*G06N 20/00* (2019.01)
*G06F 40/51* (2020.01)

(52) U.S. Cl.
CPC ............ *G06F 40/30* (2020.01); *G06F 40/51* (2020.01); *G06N 20/00* (2019.01)

(58) Field of Classification Search
CPC .......... G06N 20/00; G06N 3/08; G06F 40/30; G06F 40/51; G06F 40/216
USPC ............................................................ 704/9
See application file for complete search history.

(56) References Cited

U.S. PATENT DOCUMENTS

| 10,545,918 | B2* | 1/2020 | Emadzadeh | ............ H04L 29/08 |
| 10,664,662 | B2* | 5/2020 | Awadallah | ............ G06F 40/216 |
| 2018/0373979 | A1* | 12/2018 | Wang | ..................... G06N 20/00 |

* cited by examiner

*Primary Examiner* — Susan I McFadden
(74) *Attorney, Agent, or Firm* — Alleman Hall Creasman & Tuttle LLP

(57) ABSTRACT

A method for applying a trained machine learning model to answer a user query comprises receiving a query text from a user. A previously-trained discriminator is received, the previously-trained discriminator configured to output, for a pair of sentences, a match value indicating a quality of semantic match between the pair of sentences. For each candidate answer text of a plurality of candidate answer texts, the previously-trained discriminator is operated to output a candidate match value for the query text and the candidate answer text based on comparing a first hierarchy of representations of the query text at increasing degrees of semantic compression to a second hierarchy of representations of the candidate answer text at increasing degrees of semantic compression. An answer text is output that is associated with a highest candidate match value among candidate match values.

20 Claims, 5 Drawing Sheets

MULTI-SCALE MODEL FOR SEMANTIC MATCHING

CROSS REFERENCE TO RELATED APPLICATIONS

This application is a continuation of U.S. patent application Ser. No. 15/956,585, filed Apr. 18, 2018, the entirety of which is hereby incorporated herein by reference for all purposes.

BACKGROUND

Computer systems frequently store text data arising from user interactions (e.g., with the computer systems and/or with other users). For example, computer systems such as email servers or community question answering systems may store questions posed by users and answers to the questions. A computer system may be configured to search stored text data to assist a user, for example to locate relevant answers to questions posed by the user. However, automated systems for matching text-to-text (e.g., sentences) are often limited in their ability to semantically match text, and often return results that are less relevant than desired.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

The present disclosure is directed to a method for estimating a quality of semantic match between a first sentence and a second sentence. The method includes (1) outputting, for each sentence, a hierarchy of representations at increasing degrees of semantic compression, and (2) comparing a selected representation in each hierarchy of representations to multiple representations in the other hierarchy. This is done to output a match value indicating a quality of semantic match between the first sentence and the second sentence based on the representation comparisons.

DETAILED DESCRIPTION

Figure 1:
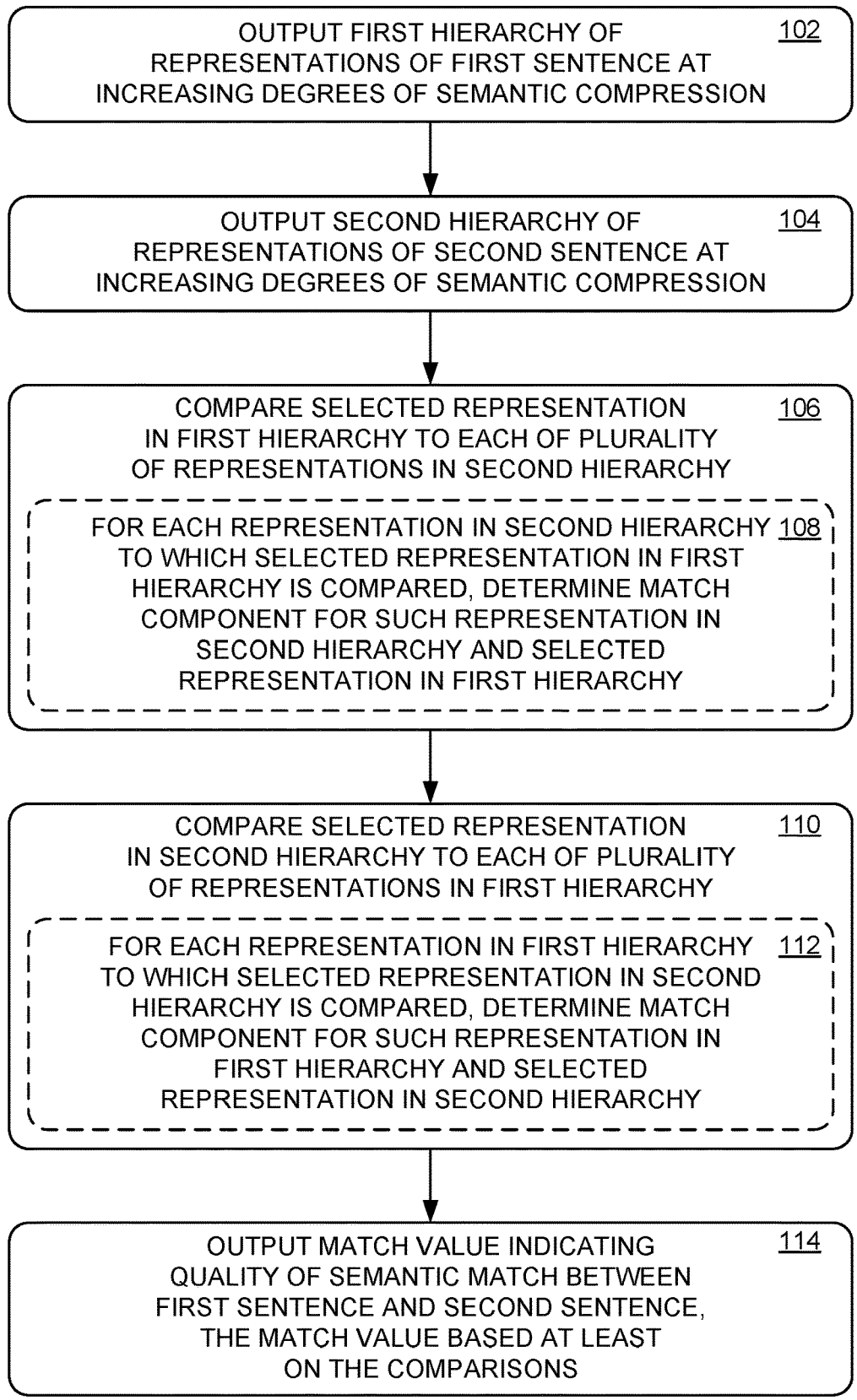
FIG. 1 shows a method for estimating a quality of semantic match of a first sentence to a second sentence.

Users frequently employ computing systems to answer questions. For example, when a user needs to find an answer to a question, the user may communicate with another user (e.g., via email) in order to pose the question to the other user. In other examples, the user may search for the answer to the question by searching and/or browsing a database of previously answered questions, e.g., a community question answering system wherein users may publicly answer questions posed by other users.

Users may pose a large variety of questions when using computing systems. For example, users may pose questions including: 1) how-to questions (e.g., "How do I re-install the operating system on my computer?"), 2) when/where/who questions (e.g., "Who invented the lightbulb?"), 3) verification questions (e.g., "Is the concert going to be on the 25th of September?"), 4) quantification questions (e.g., "How many movies set new box office records this year?"), 5) definition questions (e.g., "What does the biological term 'carapace' mean?"), 6) causal relation questions (e.g., "Why did the Titanic sink?", or "What will happen if my car battery runs out?"), and 7) request questions (e.g., "Can I borrow your desk chair for a meeting?"), to name just a few non-limiting categories/types of questions. As a result, over time, computing systems may store a large quantity and variety of questions and answers (e.g., in a server holding questions/answers exchanged via email, or in a database of a community question answering system).

However, while a computing system may store a large quantity of questions and answers, using the questions and answers may not well-facilitated by the configuration of the computing system. As such, it may be difficult for a user to obtain a relevant answer to a question. For example, a computing system may be configured to search for question/answer pairs based on low-level lexical content (e.g., textual characters and words) of a question submitted by a user.

However, in some cases, the question submitted by the user may not contain similar lexical content to an answer stored by the computing system. For example, the question submitted by the user may express the same semantic content as an answer stored by the computing system, but where the answer contrasts lexically—i.e., uses different words and/or phrases (e.g., synonyms). In other cases, the question submitted by the user may contain similar lexical content to an answer stored by the computing system, despite a dissimilarity of semantic content of the questions. Accordingly, approaches relying on lexical similarity can miss relevant results and return false positives, which in turn may require additional searching, longer and more complex computations, slower searches, and/or additional costly interventions such as manual user voting to identify relevant answers to questions.

In addition to questions and answers, a computer system may store other text, e.g., as a collection of sentences. "Sentence" may be used herein to refer to any sequence of words and/or other textual content, e.g., questions, answers, phrases, sentences, paragraphs, and/or whole documents. Accordingly, users of the computer system may wish to search for a sentence that is closely semantically related to another sentence. However, as with questions/answers, given a first sentence, searching for a second sentence based on lexical content may be slower and more computationally expensive, not to mention potentially yielding less relevant results. As a result, the stored text may occupy storage space of the computer system, but effective utilization of the stored text may not be practicable.

Accordingly, the present disclosure is directed to a method for estimating a quality of semantic match of a first sentence to a second sentence via a multi-scale matching model. The multi-scale matching model may be implemented in a discriminator configured to output a match value indicating a quality of semantic match between a first sentence and a second sentence. The discriminator may be trained on positive sentence pairs indicating pairs of sentences which are believed to be mutually relevant, e.g., based on ground truth data provided by one or more human evaluators. The discriminator, including the multi-scale matching model, may be further trained using a generator which utilizes the same multi-scale matching model to select, and provide to the discriminator, instructive negative sentence pairs for use in training the discriminator. Additionally, the generator may be trained to improve the negative sentence pairs to be more effective for training the discriminator.

The multi-scale matching model may be used to estimate a quality of semantic match between a first sentence and a second sentence in a variety of contexts. In some examples, the multi-scale matching model may enable a computer system to utilize text data (e.g., stored sentences) that would not otherwise be utilized, e.g., by enabling searching for relevant text based on an input text. In other examples, the multi-scale matching model may enable the computer system to improve an efficiency of usage of storage space, e.g., by identifying text data that is unlikely to be utilized in the near future, and moving the data to a different storage device (e.g., so that data which is likely to be utilized remains cached at a faster storage device, and so that data which is unlikely to be utilized is available at a different storage device which may be cheaper, slower, and/or more spatially distant to the computer system). Similarly, the multi-scale matching model may enable the computer system to more readily access text data that is likely to be relevant by replicating and/or migrating the text data to a faster storage device of the computer system (e.g., by copying text data that is likely to be relevant from a relatively slower hard disk of the computer system to relatively faster random-access memory of the computer system).

The multi-scale matching model may be used to implement a question/answer search system configured to evaluate a quality of semantic match of one or more answers to a question, and to output one or more answers having a relatively high-quality semantic match to the question. In some examples, the question/answer search system may be configured to display the one or more answers to a human attendant, who may be prompted to select a single best answer from the one or more answers. For example, the question/answer search system may enable an email utility configured to aid a first user in automatically answering questions posed by a second user, by presenting a selection of potentially relevant answers and prompting the first user to select a best answer to send as a response to the second user's question. In other examples, the question/answer search system may be configured to receive a question from a user, to select a best answer, and to display the selected best answer to the user.

The multi-scale matching model may also enable improved community question answering systems. In some examples, the multi-scale matching model may be used to automatically collect frequently asked questions and corresponding answers, e.g., to display the frequently asked questions and answers to all users of the community question answering system. In some examples, the multi-scale matching model may be used to automatically recognize and merge multiple instances of a similar question, so as to collect one or more relevant answers to the similar questions. In some examples, the multi-scale matching model may recognize a question submitted by a user as having been previously answered, and present an answer to the user so as to speed delivery of relevant content.

FIG. 1 shows an exemplary method 100 for estimating a quality of semantic match of a first sentence to a second sentence. At 102, method 100 includes outputting a first hierarchy of representations of the first sentence at increasing degrees of semantic compression. At 104, method 100 includes outputting a second hierarchy of representations of the second sentence at increasing degrees of semantic compression.

For each representation in the first and second hierarchies of representations, such representation may include a plurality of semantic units. For a lowest representation in each of the first and second hierarchies of representations, each semantic unit of such lowest representation may correspond to a word. For each representation in the first and second hierarchies of representations that is higher than one or more lower representations in that same hierarchy, each semantic unit in such higher representation may be based on one or more semantic units of one or more lower representations in that same hierarchy. Accordingly, for each representation in each of the first and second hierarchies of representations that is higher than the lowest representation, each semantic unit in such higher representation may correspond to multiple words.

For example, in a hierarchy of representations including three representations, each semantic unit in the lowest representation may correspond to a word, while each semantic unit in a middle representation (e.g., a second-highest or second-lowest representation) may correspond to a short phrase of five words, and while each semantic unit in a highest representation may correspond to a longer phrase of seven words. In this manner, a semantic unit in a higher representation of a sentence may represent a portion of the sentence in a semantically compressed form, because the semantic unit represents more semantic content of the sentence as compared to semantic units of lower representations of the sentence. Accordingly, higher representations in a hierarchy of representations have increasing degrees of semantic compression, as compared to lower representations in the hierarchy of representations.

At 106, method 100 includes comparing a selected representation in the first hierarchy to each of a plurality of representations in the second hierarchy. Optionally, at 108, comparing the selected representation in the first hierarchy to each of the plurality of representations in the second hierarchy includes, for each representation in the second hierarchy to which the selected representation in the first hierarchy is compared, determining a match component for such representation in the second hierarchy and the selected representation in the first hierarchy.

At 110, method 100 includes comparing a selected representation in the second hierarchy to each of a plurality of representations in the first hierarchy. Optionally, at 112, comparing the selected representation in the second hierarchy to each of the plurality of representations in the first hierarchy includes, for each representation in the first hierarchy to which the selected representation in the second hierarchy is compared, determining a match component for such representation in the first hierarchy and the selected representation in the second hierarchy.

At 114, method 100 includes outputting a match value indicating a quality of semantic match between the first sentence and the second sentence, wherein the match value is based at least on the comparisons (e.g., based at least on comparing the selected representation in the first hierarchy to each of the plurality of representations in the second hierarchy at 106, and comparing the selected representation in the second hierarchy to each of the plurality of representations in the first hierarchy at 110). Accordingly, the match value may indicate a quality of semantic match between the first sentence and the second sentence based on 1) a one-way match between the selected representation of the first sentence and each representation of the second sentence, and 2) a one-way match between the selected representation of the second sentence and each representation of the first sentence.

In an example, the selected representation in the first hierarchy is a lowest representation in the first hierarchy (e.g., a representation in which each semantic unit corresponds to a word), and the selected representation in the second hierarchy is a lowest representation of the second hierarchy. Accordingly, the match value output at 114 may indicate a quality of semantic match between the first sentence and the second sentence based on 1) a one-way match between semantic units corresponding to words in the first sentence and semantic units corresponding to phrases of various sizes in the second sentence, and/or 2) a one-way match between semantic units corresponding to words in the second sentence and semantic units corresponding to phrases of various sizes in the first sentence.

Comparing the selected representation in the second hierarchy to each of a plurality of representations in the first hierarchy may include, for each representation in the first hierarchy to which the selected representation in the second hierarchy is compared, determining a match component for such representation in the first hierarchy and the selected representation in the second hierarchy. Similarly, comparing the selected representation in the first hierarchy to each of a plurality of representations in the second hierarchy may include, for each representation in the second hierarchy to which the selected representation in the first hierarchy is compared, determining a match component for such representation in the second hierarchy and the selected representation in the first hierarchy. Accordingly, the match value output at 114 may be based on the match components. Outputting the match value based on the match components will be described in more detail below with reference to FIG. 3.

In some examples, for each representation in the second hierarchy to which the selected representation in the first hierarchy is compared, the associated match component is based on quality values associated with target semantic units of the selected representation in the first hierarchy, each quality value indicating a quality of match between such target semantic unit in the selected representation in the first hierarchy and the semantic units of the representation in the second hierarchy. Similarly, in these examples, for each representation in the first hierarchy to which the selected representation in the second hierarchy is compared, the associated match component is based on quality values associated with target semantic units of the selected representation in the second hierarchy, each quality value indicating a quality of match between such target semantic unit in the selected representation in the first hierarchy and the semantic units of the representation in the second hierarchy. As such, each match component may represent a semantic match between the selected representation in one hierarchy and a different selected representation in the other hierarchy. The determination of a match component based on quality values for a comparison between two representations will be described in more detail below, with regard to FIG. 4.

In some examples, outputting the match value at 114 may be further based on comparing an additional representation in the first hierarchy or the second hierarchy to one or more representations in the other of the first and second hierarchies. For example, when the selected representation in each hierarchy is a lowest representation in that hierarchy, outputting the match value at 114 may be further based on comparing a highest representation in the first hierarchy to a highest representation In some examples, method 100 may be enacted based at least on a machine learning model including one or more trainable parameters. The one or more parameters may at least partially determine aspects of method 100 when enacted in this manner. The one or more trainable parameters may be trained, e.g., adjusted in response to training data.

A machine learning model trained to enact method 100 may be referred to herein as a discriminator, e.g., a model configured to discriminate between sentence pairs based on whether or not the sentences in a pair are a high-quality semantic match. In some examples, a discriminator may be based on a multi-scale matching model including a word embedding model and a convolutional neural network model, as will be described in more detail below with regard to FIGS. 3 and 4. For example, a discriminator may include a multi-scale matching model f parametrized by one or more trainable weights (the trainable weights collectively referred to as weights θ) and configured to compute a scalar output based on a first sentence input and a second sentence input. Accordingly, the multi-scale matching model parametrized by the one or more trainable weights may be referred to herein as $f_\theta$. A discriminator may be defined based on any suitable function of an output of the multi-scale matching model, e.g., based on a sigmoid function σ (e.g., a logistic sigmoid function, or a hyperbolic tangent function) configured to receive a scalar input and output a scalar output within a defined range, e.g., between 0 and 1. As such, the output of a discriminator D(A|Q) comparing a first sentence A and a second sentence Q is a scalar output within a defined range, which may be defined as $D(A|Q)=\sigma(f_\theta(Q, A))$. Accordingly, an output of the discriminator that is near the low end of the defined range (e.g., near 0) may be interpreted as indicating a low quality of semantic match between A and Q, whereas an output of the discriminator that is near the high end of the defined range (e.g., near 1) may be interpreted as indicating a high quality of semantic match between A and Q.

In some examples, training data may include a plurality of exemplary labelled sentence pairs, where a labelled sentence pair includes a first sentence, a second sentence, and a ground truth label indicating whether or not the first sentence is a high-quality semantic match to the second sentence. Labelled sentence pairs where the first sentence is a high-quality semantic match to the second sentence may be referred to herein as positive sentence pairs, and labelled sentence pairs where the first sentence is not a high-quality match to the second sentence may be referred to herein as negative sentence pairs. Accordingly, training a discriminator may include providing, to the discriminator, negative sentence pairs and/or positive sentence pairs, and based on a match value output by the discriminator responsive to a sentence pair, adjusting the one or more trainable parameters of the discriminator so that, given the same sentence pair, the discriminator would output a match value that more closely matches the ground truth label (e.g., a match value close to 0 for negative sentence pairs, and a match value close to 1 for positive sentence pairs).

Method 100 may enable operating an answer suggestion engine configured to output an answer based on a question text and a plurality of candidate answer texts, by selecting a candidate answer that has a high quality of semantic match with the question text. Accordingly, outputting the answer may include, for each candidate answer text of the plurality of candidate answer texts, outputting a candidate match value indicating a quality of semantic match between the question text and the candidate answer text (e.g., each match value being similarly-generated according to method 100 wherein the first sentence is the question text and the second sentence is the candidate answer text); and outputting a candidate answer text having a highest candidate match value.

In some examples, the answer suggestion engine may be configured to output a plurality of answers. For example, the answer suggestion engine may be configured to assist a first user in answering questions posed by a second user, e.g., by presenting a small selection of answers that have a high-quality semantic match with a question posed by the second user, so that the first user may select a best answer from the small selection and provide the best answer to the second user in response to their question.

When method 100 is used to operate an answer suggestion engine, ground truth labels may derived from user feedback responsive to outputting an answer (e.g., based on a user indicating whether or not the answer was relevant to a question they asked).

Figure 2:
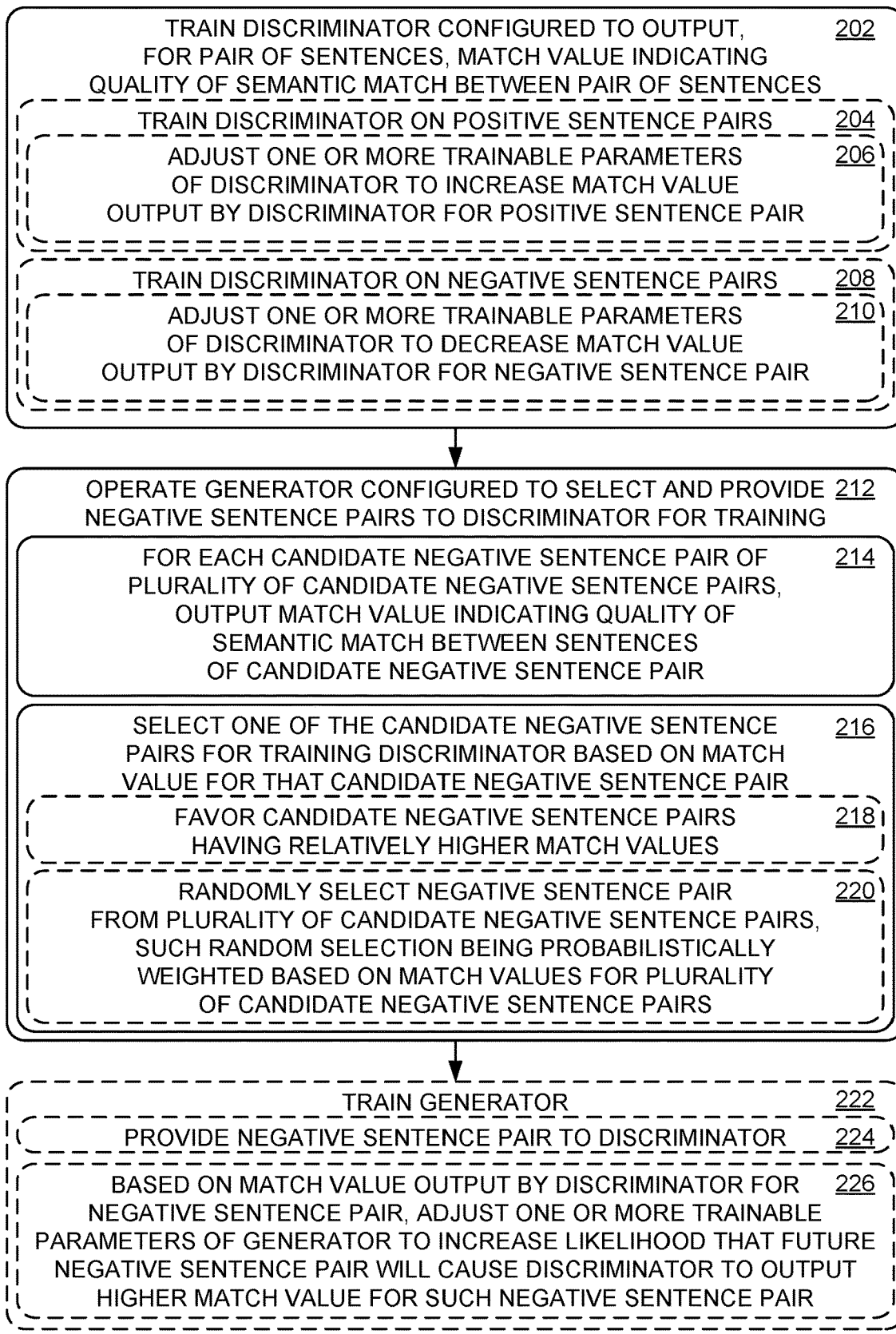
FIG. 2 shows an example method for training a discriminator to estimate a quality of semantic match between sentences.

FIG. 2 shows an exemplary method 200 for training a discriminator to estimate quality of semantic match between sentences. At 202, method 200 includes training a discriminator configured to output, for a pair of sentences, a match value indicating a quality of semantic match between a pair of sentences. The discriminator may be configured to output the match value based on a multi-scale matching model f(e.g., configured to enact method 100). At 204, training the discriminator includes training the discriminator on positive sentence pairs. Accordingly, at 206, training the discriminator on a positive sentence pair includes adjusting one or more trainable parameters of the discriminator to increase a match value output by the discriminator for the positive sentence pair (e.g., so that the match value output by the discriminator for the positive sentence pair would be closer to 1). At 208, training the discriminator includes training the discriminator on negative sentence pairs. Accordingly, at 210, training the discriminator on a negative sentence pair includes adjusting one or more trainable parameters of the discriminator to decrease a match value output by the discriminator for the positive sentence pair (e.g., so that the match value output by the discriminator for the negative sentence pair would be closer to 0).

In some examples, training the discriminator on a sentence pair may include calculating an objective function J, where the objective function J measures a level of agreement between a match value output by the discriminator and a ground truth label of the sentence pair. For a discriminator D(A|Q) configured to output a scalar output between 0 and 1, the objective function J may be defined based on expected values of the output of the discriminator D for a randomly sampled sentence pair. For example, the value of the objective function may be defined as $J = \mathbb{E}_{x \sim positive}[\log D(x)] + \mathbb{E}_{x' \sim negative}[\log(1-D(x'))]$, where $\mathbb{E}_{x \sim positive}[\log D(x)]$ indicates the logarithm (e.g., in any suitable base, such as base 2, base e or base 10) of the output of the discriminator for a randomly selected sentence pair x drawn from among positive sentence pairs, and where $\mathbb{E}_{x' \sim negative}[\log(1-D(x'))]$ indicates the logarithm of 1 minus the output of the discriminator for a randomly selected sentence pair x' drawn from among negative sentence p airs.

Accordingly, the expected value $\mathbb{E}_{x \sim positive}[\log D(x)] + \mathbb{E}_{x' \sim negative}[\log(1-D(x'))]$ is a high value if D is likely to output a match value near 1 for positive sentence pairs and/or likely to output a match value near 0 for negative sentence pairs; respectively, the expected value is a low value if D is likely to output a match value near 0 for positive sentence pairs and/or likely to output a match value near 1 for negative sentence pairs. The expected value $\mathbb{E}_{x \sim positive}[\log D(x)] + \mathbb{E}_{x' \sim negative}[\log(1-D(x'))]$ may be approximated by a sum of actual outputs of D for a plurality of sentence pairs (e.g., including negative sentence pairs and positive sentence pairs).

The goal of training the discriminator may be formulated as an optimization problem with regard to the objective function J, e.g., maximizing the value of the objective function J with regard to the one or more trainable parameters of the discriminator. Accordingly, training the discriminator may result in higher values of the objective function J, where higher values of the objective function J may indicate increased likelihood of on outputting a match value near 1 for positive sentence pairs and of outputting a match value near 0 for negative sentence pairs.

In some examples, adjusting the one or more trainable parameters of the discriminator may be based on calculating a gradient $\nabla_\theta J$ of the objective function J with regard to the one or more trainable parameters. The gradient $\nabla_\theta J$ of the objective function J may indicate a derivative of the output of the objective function with regard to each of the one or more trainable parameters. Accordingly, adjusting the one or more trainable parameters may include adjusting a parameter by increasing the parameter if the gradient with regard to that parameter is positive, and decreasing the parameter if the gradient with regard to that parameter is negative (e.g., so that in either case, the output of the objective function will be increased). For example, adjusting the one or more trainable parameters may include training via gradient descent or any other gradient-based optimization method (e.g., conjugate gradient methods).

In some examples, the discriminator may be implemented as a differentiable program, wherein calculations performed by the differentiable program may be differentiated to obtain the gradient $\nabla_\theta J$ of the objective function J. For example, as will be described below with reference to FIGS. 3 and 4, when the discriminator is implemented based on a word embedding model and a convolutional neural network, the discriminator may be differentiated based on the backpropagation algorithm for neural networks.

Training a discriminator based on positive sentence pairs and negative sentence pairs may require instructive exemplary sentence pairs. A sentence pair may be referred to herein as "instructive" if training the discriminator on the sentence pair would likely result in a substantial adjustment to the one or more trainable parameters of the discriminator, wherein the substantial adjustment makes the discriminator more likely to cause a high output of the objective function J for future examples.

Instructive positive sentence pairs may include sentences that are a high-quality semantic match, so that the discriminator can be trained to recognize high-quality semantic matches in the future. In some examples, instructive positive sentence pairs may be sentence pairs which human evaluators have assessed to be mutually relevant. For example, an instructive positive sentence pair may include a question and an answer which a human evaluator has indicated to be responsive to the question.

Although positive sentence pairs having a high-quality semantic match may be instructive, negative sentence pairs having a low-quality semantic match may not be as instructive. In some examples, negative sentence pairs that are a low-quality semantic match may be relatively easy for the discriminator to learn to distinguish from positive sentence pairs. As such, the one or more trainable parameters of the discriminator may converge, based on a small number of negative sentence pairs, so that future negative sentence pairs no longer result in a substantial change to the one or more trainable parameters of the discriminator.

For example, when sentence pairs are question text/answer text pairs, a negative question text/answer text pair may include a question text and an answer text that is not responsive to the question text, e.g., a non-sequitur wherein the first sentence and the second sentence are completely unrelated. Accordingly, the discriminator may quickly be trained to recognize non-sequiturs. However, if the only negative sentence pairs provided to the discriminator for training are highly unrelated, the discriminator may fail to accurately discern between a positive sentence pair that is semantically related and a negative sentence pair that is semantically related. In other words, it will often be desirable to train the discriminator with negative sentence pairs that appear to be relevant.

Accordingly, a more instructive negative sentence pair may include a first sentence and a second sentence which are known to be unrelated (i.e., a negative pair) despite appearing to be a high-quality semantic match. For example, an instructive negative sentence pair may include a first sentence and a second sentence that appear to be semantically related, but are merely lexically similar.

Furthermore, instructive exemplary positive sentence pairs may be more readily available than instructive exemplary negative sentence pairs. For example, when exemplary sentence pairs include question text/answer text pairs, a sentence pair may include a positive ground truth label, i.e., a positive indication that an answer to a question is relevant. However, negative sentence pairs may not be similarly identified. For example, in the case of human evaluators, they may only label certain positive pairs, such that a great many sentence combinations within an information environment are not labeled as positive or negative.

Accordingly, a generator may be configured to generate high-quality, instructive negative sentence pairs, so that the discriminator may be trained based on positive sentence pairs in addition to the generated negative sentence pairs. In some examples, the discriminator may be additionally trained based on additional negative sentence pairs not generated by the generator (e.g., instructive negative sentence pairs defined by ground truth labels provided by the human evaluators).

At 212, method 200 further includes operating a generator configured to select and provide negative sentence pairs to the discriminator for training. The generator may be trained to generate instructive negative sentence pairs, e.g., negative sentence pairs which may cause the discriminator to output a high match value indicating a high-quality semantic match, despite the sentences included in each pair not actually being semantically related. For example, the generated negative sentence pairs may include sentence pairs in which a first sentence of each pair is lexically similar to a second sentence of the pair, despite the two sentences not actually being a high-quality semantic match. Accordingly, negative sentence pairs selected and provided by the generator may cause a relatively large adjustment to the one or more trainable parameters of the discriminator, as compared to 1) negative sentence pairs defined by ground truth labels provided by one or more human evaluators, or 2) negative sentence pairs defined by selecting arbitrary pairs of sentences where the sentences in the pair are not included together in a positive sentence pair.

In order to select one or more instructive negative sentence pairs, the generator selects a first sentence, and additionally selects a second sentence which would form an instructive negative sentence pair when paired with the first sentence. For a particular first sentence, the generator selects a negative sentence pair from a plurality of candidate negative sentence pairs. In some examples, the plurality of candidate negative sentence pairs is constructed based on pairing a target sentence with each sentence of a plurality of other sentences, wherein none of the plurality of other sentences is included in a positive sentence pair with the target sentence. For example, the target sentence may be included in one or more positive sentence pairs, indicating that the target sentence is a high-quality semantic match to other sentences in the one or more positive sentence pairs. Accordingly, it may be unlikely that the target sentence is a high-quality semantic match for any other sentence in the plurality of other sentences. In some examples, the plurality of negative sentence pairs may be based on ground truth labels, e.g., each negative sentence pair may be indicated to include a pair of sentences having a low-quality semantic match. In some examples, the plurality of negative sentence pairs may be a relatively small subset of a larger plurality of negative sentence pairs, e.g., hundreds or thousands of negative sentence pairs out of a larger plurality including potentially millions, billions, or more sentence pairs.

At 214, selecting and providing a negative sentence pair includes, for each candidate negative sentence pair of the plurality of negative sentence pairs, outputting a match value indicating a quality of semantic match between sentences of the candidate negative sentence pair. The generator may be configured to output the match value based on a multi-scale matching model f(e.g., configured to enact method 100), similar to the discriminator. Accordingly, the generator itself may be trainable by adjusting one or more trainable parameters $\theta'$ of the multi-scale matching model. Although the generator may be configured to use a multi-scale matching model with substantially the same architecture as a multi-scale matching model of the discriminator, each multi-scale matching model may include a different set of one or more trainable parameters (e.g., $\theta$ for the discriminator and $\theta'$ for the generator), which may be trained so as to satisfy different goals in training. Accordingly, for a given sentence pair, each multi-scale matching model may output a distinct match value.

As described above, the match value output by the multi-scale matching model of the discriminator may indicate an actual quality of semantic match between the sentences of the given sentence pair (e.g., as defined by ground truth labels). In contrast, the match value $f_{\theta'}(Q, A)$ output by the multi-scale matching model of the generator for a candidate negative sentence pair including first sentence Q and second sentence A may instead indicate a likelihood that the sentence pair would cause the discriminator to output a low value for the objective function J with regard to that candidate negative sentence pair. For example, a high match value output by the multi-scale matching model of the generator may indicate that a candidate negative sentence pair is instructive, whereas a low match value output by the multi-scale matching model of the generator may indicate that a candidate negative sentence pair is not particularly instructive.

At 216, selecting and providing the negative sentence pair includes selecting one of the candidate negative sentence pairs based on the match value for that candidate negative sentence pair. Optionally, at 218, selecting the candidate negative sentence pair based on the match value includes favoring candidate negative sentence pairs having relatively higher match values (e.g., as compared to other candidate negative sentence pairs). In an example, selecting a candidate negative sentence pair is based on that candidate negative sentence pair having a higher match value as compared to all other candidate negative sentence pairs from the plurality of negative sentence pairs.

Optionally, at 220, selecting the candidate negative sentence pair based on the match value includes randomly selecting a negative sentence pair from the plurality of candidate negative sentence pairs, such random selection being probabilistically weighted based on match values output by the generator for the plurality of candidate negative sentence pairs. For example, such random selection may include assigning a probability to each candidate negative sentence pair, wherein the probability for a candidate negative sentence pair is higher when the candidate negative sentence pair has a high match value output by the generator, and wherein the probability for a candidate negative sentence pair is lower when the candidate negative sentence pair has a low match value output by the discriminator. Accordingly, such random selection may select candidate negative sentence pairs having a high match value output by the discriminator, at a higher rate than other negative sentence pairs.

In an example, randomly selecting candidate negative sentence pairs based on their match values may be based on computing a "softmax" function of the match values output by the multi-scale matching model of the generator. The softmax function may scale the match values so that they form a probability distribution (e.g., so that each scaled match value is between 0 and 1 and so that a sum of the scaled match values is 1). The softmax function may be parametrized by a temperature hyper-parameter $\tau$ (e.g., a temperature value which is chosen for the generator model, wherein $\tau$ may or may not be adjusted based on training). For example, to randomly select from a plurality of candidate negative sentence pairs defined by pairing a first sentence Q with each choice of second sentence drawn from sentences $A_i$ for a plurality of different indices i, the generator may evaluate the probability $P(A_i/Q)$ of selecting first sentence Q and a particular choice of second sentence $A_i$, with regard to the other $A_j$ (for each other index j where j≠1) as the softmax output $$P_G(A_i/Q) = \frac{\exp(f_{\theta'}(QA_i)/\tau)}{\sum_j \exp(f_{\theta'}(Q, A_j)/\tau)}.$$

The temperature hyper-parameter $\tau$ controls a likelihood of selecting a candidate negative sentence pair with a high match value. For example, when $\tau$ approaches 0, the softmax function outputs a value near 0 for lower match values, so that a resulting probability distribution defines a substantially higher likelihood of selecting a candidate negative sentence pair with a higher match value. When $\tau$ is increased, the resulting probability distribution defines a more similar likelihood for each candidate negative sentence pair, so that a likelihood of selecting each candidate negative sentence pair is closer to uniform. In an example, $\tau$ is set to 2, e.g., so that there is a moderate likelihood of selecting candidate negative sentence pairs even when they may have a low match value. By randomly selecting candidate negative sentence pairs according to the softmax function, the generator may select and provide a diverse selection of instructive negative sentence pairs to the discriminator for training.

Based on favoring candidate sentence pairs with high match values output by the generator (e.g., by random selection weighted to favor the candidate sentence pairs with high match values), a candidate negative sentence pair selected by the generator may be likely to cause the discriminator to incorrectly output a high match value, thereby resulting in a low value of the objective function J due to the disagreement between the high match value and the negative label of the sentence pair. An incorrect, high match value may result in a relatively large gradient of the objective function J, thereby causing a larger adjustment to the one or more trainable parameters of the discriminator. Accordingly, negative sentence pairs selected and provided by the generator may result in more effective learning by the discriminator, as compared to arbitrary choices of negative sentence pairs from the initial plurality of negative sentence pairs.

Optionally, at 222, method 200 may further include training the generator (e.g., in order to cause the generator to select negative sentence pairs that, when provided to the discriminator, are more likely to cause the discriminator to output high match values, so that outputs of the objective function J are lower for the selected negative sentence pairs). At 224, training the generator includes providing a negative sentence pair, selected by the generator, to the discriminator. At 226, training the generator includes, based on a match value output by the discriminator for the negative sentence pair, adjusting one or more trainable parameters of the generator to increase a likelihood that a future negative sentence pair selected and provided by the generator will cause the discriminator to output a higher match value for such negative sentence pair.

Similar to the discriminator, adjusting the one or more trainable parameters of the generator may be based on computing a gradient of the objective function J with regard to the one or more trainable parameters of the generator, e.g., to decrease the objective function J with regard to the one or more trainable parameters of the generator. For example, adjusting the one or more trainable parameters may be based on any suitable gradient-based optimization method (e.g., gradient descent or a conjugate gradient method). The objective function J is shared by the discriminator and the generator, although the objective function is defined as J= $\mathbb{E}_{x\text{-}positive}[\log D(x)]+\mathbb{E}_{x'\text{-}negative}[\log(1-D(x'))]$, in terms of match values output by the discriminator responsive to positive/negative sentence pairs, and not in terms of match values output by the multi-scale matching model of the generator. Accordingly, the one or more trainable parameters $\theta'$ of the generator may be adjusted with regard to an expected match value that would be output by the discriminator responsive to a negative sentence pair provided by the generator, so that the generator may be trained to select and provide increasingly instructive negative sentence pairs.

When the generator randomly selects candidate negative sentence pairs (e.g., as described at 220), computing the gradient of the objective function may include estimating a gradient for the objective function with regard to a random sampling procedure. Although the multi-scale matching model (included in the discriminator may be differentiable with regard to the objective function J and the weights $\theta'$, random selection of candidate negative sentence pairs based on match values may not be implemented in terms of a differentiable function. Accordingly, a gradient $\nabla_{\theta'}J$ of the objective function J with regard to the parameters $\theta'$ may be approximated based on a gradient (with regard to the parameters θ') of an expectation value of the objective function J with regard to a negative sentence pair randomly sampled by the generator from a plurality of candidate negative sentence pairs Ã drawn from a larger plurality of sentences A. For example, the gradient may derived as $\nabla_{\theta'} J = \nabla_{\theta'} \mathbb{E}_{(A',Q) \sim P_{(A'|Q)}} [\log(1-D(A'|Q))] = \Sigma_{A' \in A} \nabla_{\theta'} P(A'/Q) \log(1-D(A'/Q)) = \mathbb{E}_{(A',Q) \sim P(A'|Q)} [\nabla \theta' \log P(A'|Q) \log(1-D(A'|Q))]$ which may be approximated for the plurality of candidate negative sentence pairs Ã as $$\nabla_{\theta'} J \simeq \frac{1}{|\tilde{A}|} \sum_{A' \in \tilde{A}} \nabla_{\theta'} \log P(A' \mid Q) \log(1 - D(A' \mid Q)).$$

A training procedure for training the generator and the discriminator may alternate between 1) training the discriminator (e.g., by providing a positive sentence pair or a negative sentence pair, where the negative sentence pair may be selected and provided by the discriminator) and 2) training the generator. Accordingly the training procedure may alternate between 1) adjusting weights of the discriminator so as to increase a value of the objective function J and 2) adjusting weights of the generator so as to decrease a value of the objective function J. As a result of the training procedure, the discriminator may be trained to effectively predict an actual quality of semantic match of a sentence pair (e.g., as compared to a ground truth label for the sentence pair, when such ground truth label is available), while the generator may be trained to effectively select and provide instructive negative examples for training the discriminator.

Match values output by the generator and by the discriminator may differ for a given sentence pair, e.g., as the discriminator is configured to output a match value that may approximate a ground truth label of the given sentence pair, whereas the generator is configured to output a match value that may correspond to a likelihood that the discriminator will output a higher match value for the given sentence pair even when the given sentence pair is a negative sentence pair (e.g., for which the discriminator should output a lower match value). Although the generator and discriminator may be configured differently, each of the generator and the discriminator may be implemented to output match values according to method 100. For example, each of the generator and the discriminator may be implemented based on a separate instance of a multi-scale matching model including a word embedding model and a convolutional neural network model. Based on training the generator and training the discriminator, each instance of the multi-scale matching model may attain different values for the one or more trainable parameters of the instance, thereby determining how each instance outputs match values.

Figure 3:
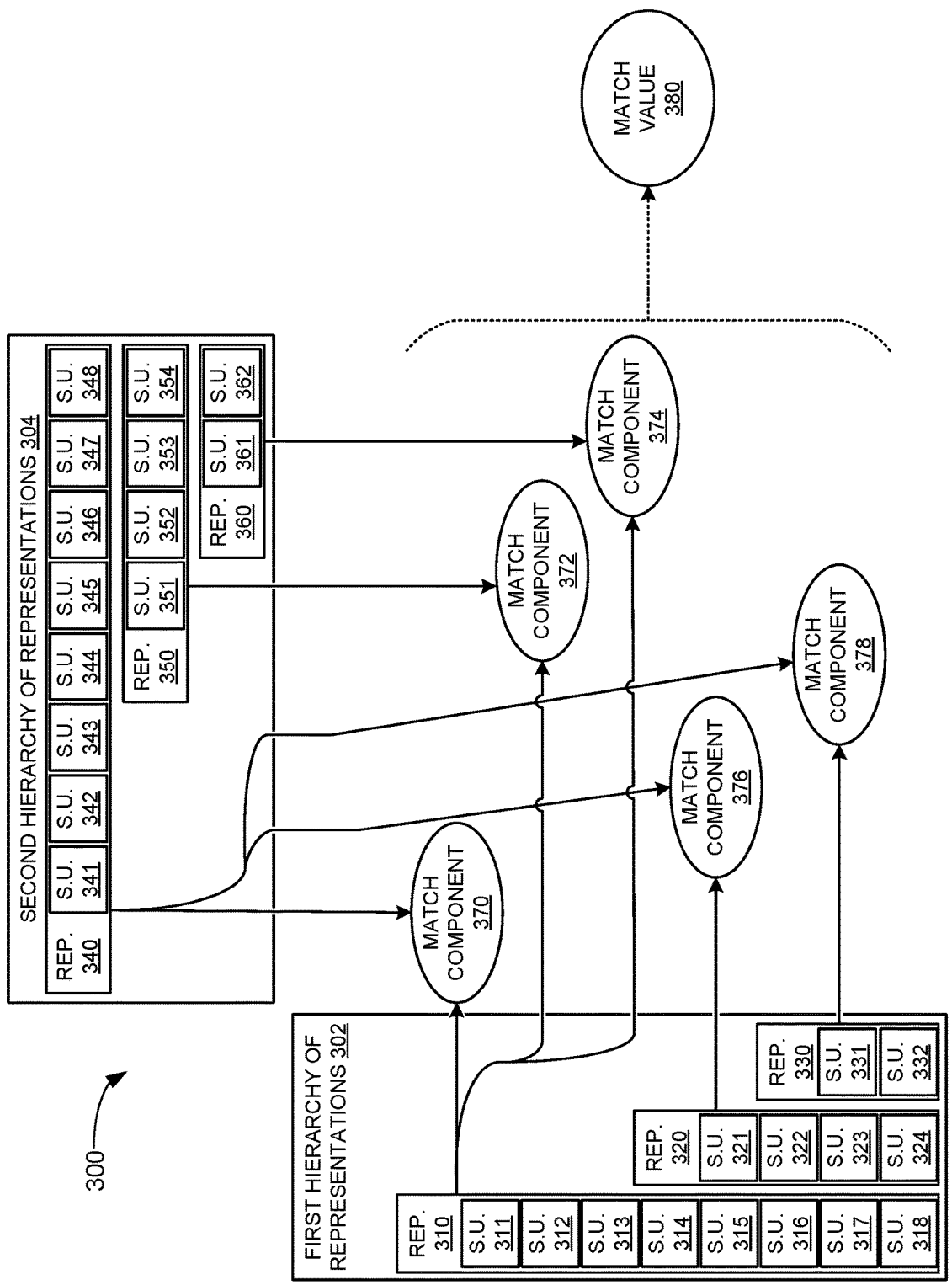
FIG. 3 depicts an example architecture for computing a match value indicating a quality of semantic match between a first hierarchy of representations of a first sentence and a second hierarchy of representations of a second sentence.

FIG. 3 shows a multi-scale matching model 300 configured to output match values. Multi-scale matching model 300 may be suitable for enacting method 100, e.g., to implement a generator or a discriminator as described above. Multi-scale matching model 300 includes one or more trainable parameters, which may be adjusted to train the generator or discriminator. The multi-scale matching model disclosed herein is a general architecture which may be instantiated in a generator or discriminator model, and trained by adjusting trainable parameters according to a gradient of the objective function for the generator or discriminator model.

For example, training a discriminator with the help of a generator as described above may include instantiating a first multi-scale matching model 300 in the discriminator and a second, separate multi-scale matching model (e.g., including separate trainable parameters) in the generator. The second multi-scale matching model may be implemented similarly to the first multi-scale matching model 300, e.g., according to the following description of the first multi-scale matching model 300, wherein the one or more trainable parameters of the second multi-scale matching model are separately instantiated and distinct from the one or more trainable parameters of the first multi-scale matching model 300. As described above with reference to method 200, training the discriminator and training the generator may include alternating between adjusting parameters of the discriminator to increase a value of the objective function for a given sentence pair, and adjusting parameters of the generator to decrease a value of the objective function for a sentence pair.

Outputting a match value for a first sentence and a second sentence via multi-scale matching model 300 includes outputting a first hierarchy of representations 302 of the first sentence, and outputting a second hierarchy of representations 304 of the second sentence. Representations of the sentence in each hierarchy of representations may be at increasing degrees of semantic compression.

In an example, a lowest representation 310 in the first hierarchy of representations 302 includes a plurality of semantic units (e.g., semantic units 311-318) wherein each semantic unit corresponds to a word of the first sentence. Similarly, a lowest representation 340 in the second hierarchy of representations 304 includes a plurality of semantic units corresponding to words of the second sentence (e.g., semantic units 341-348).

In some examples, semantic units corresponding to words (e.g., semantic units of representation 310) may be output by a word embedding model. The word embedding model may be configured to generate, for a particular word, vectors of numbers indicating the word as a vector in a latent vector space. The latent vector space may define semantic relationships between words based on geometric and/or topological properties of the latent vector space, e.g., two words with similar definitions may be represented by vectors having a similar angle and magnitude within the latent vector space. The vectors output by the word embedding model for each word may be vectors of a defined dimensionality, wherein each vector has an identical dimensionality (e.g., 128 elements or any other suitable number of elements).

In some examples, the word embedding model may include one or more trainable parameters, and training the one or more parameters of the multi-scale matching model may include training one or more parameters of the word embedding model (e.g., so that the word embeddings output by the word embedding model may be improved with regard to the overall task of the multi-scale matching model). For example, the word embedding model may be implemented in terms of differentiable functions, and training the one or more parameters of the word embedding model may be based on computing a gradient of the objective function J with regard to the one or more parameters of the word embedding model. In other examples, the word embedding model may be a fixed word embedding model. For example, the word embedding model may be implemented as a look-up table indicating a previously computed word embedding for each word of a plurality of words. In some examples, the word embedding model may be based on a global model defined for a text corpus (e.g., based on global word-word co-occurrence statistics from the whole text corpus), e.g., the GloVe™ model. In some examples, the word embedding model may be based on local context of words from a text corpus (e.g., a continuous bag-of-words model or a continuous skip-gram model), e.g., the Word2Vec™ model.

Similarly, each semantic unit of representation 340 may be output by the word embedding model based on a word of the second sentence. Accordingly, representation 310 may represent the first sentence and representation 340 may represent the second sentence at a lowest degree of compression, e.g., wherein each semantic unit in each representation corresponds to one word from the associated sentence.

A higher representation 320 in the first hierarchy of representations 302 includes a plurality of semantic units (e.g., semantic units 321-324) wherein each semantic unit corresponds to multiple words from the first sentence. In an example, each semantic unit of the higher representation 320 is output by a temporal convolutional neural network based on one or more semantic units of the lowest representation 310 (e.g., based on semantic units 311-318). For example, the convolutional network may contain a first convolutional block configured to receive as inputs the semantic units of the lowest representation 310 and to output a smaller number of semantic units of the higher representation 320, wherein semantic units of each of lower representation 310 and higher representation 320 are vectors having an identical defined number of elements, and wherein semantic units of higher representation 320 may encode the same portion of the first sentence as the one or more semantic units of the lowest representation 310. Accordingly, the semantic units output by the convolution block may compress information of the portion of the first sentence, as a particular semantic unit encodes the same portion of the first sentence as was represented by a plurality of word embeddings.

In one example, the first convolutional block includes a temporal convolution layer configured to convolve the semantic units of the lowest representation 310 with one or more convolutional kernels where each convolutional kernel defines a convolution that may recognize a spatial and/or contextual relationship of one or more semantic units of lowest representation 310. The one or more convolutional kernels may be included among the one or more trainable parameters of the multi-scale matching model, so that the one or more convolutional kernels may be adjusted during training (e.g., so as to recognize more relevant spatial and/or contextual relationships). In some examples, the convolutional kernels may have a fixed size, e.g., 3, wherein the fixed size determines a receptive field of the convolutional layer (e.g., a fixed number of adjacent semantic units from the lowest representation 310 among which the spatial and/or contextual relationships may be recognized). Because each semantic unit of a higher representation compresses the same semantic content as more than one semantic unit of a lower representation, the higher representation may include fewer semantic units than are included in the lower representation. The number of semantic units in each representation may be based on the number of words in sentences being represented, in addition to a size of convolutional kernels. Although FIG. 3 depicts a hierarchy of representations 302 including a lowest representation 310 with 8 semantic units, a representation 320 with 4 semantic units, and a highest representation 330 with 2 semantic units, in other examples, any suitable number of semantic units may be included in each representation.

The first convolutional block further includes a batch normalization layer, a non-linear activation layer (e.g., a rectified linear unit activation layer, or a sigmoid activation layer), and a pooling layer (e.g., a max pooling layer or an average pooling layer). In other examples, a convolutional block may further include additional trainable layers (e.g., additional non-linear activation layers). The batch normalization layer, non-linear activation layer, and pooling layer of a convolutional block may each be based on trainable parameters, and accordingly, adjusting the one or more trainable parameters of the multi-scale matching model may include adjusting such trainable parameters of the convolutional block layers.

Similarly, semantic units of an even higher representation 330 in the first hierarchy of representations 302 (e.g., semantic units 331 and 332) may be output by a second convolutional block of the temporal convolutional neural network based on one or more semantic units of relatively lower representation 320 (e.g., based on semantic units 321-324). In examples where there are more than three different representations in a hierarchy of representations, the convolutional neural network may include further convolutional blocks, wherein each convolutional block is configured to receive as input semantic units from a particular representation, and to output semantic units of a next higher representation.

As with the first hierarchy of representations 302, semantic units of higher representations of the second hierarchy of representations 304 (e.g., semantic units 351-354 and semantic units 361 and 362) may be output by the temporal convolutional neural network based on semantic units of relatively lower representations in the second hierarchy of representations 304.

In other examples, semantic units of a higher representation may be output by any other suitable machine learning function instead of a temporal convolutional neural network. For example, semantic units of a higher representation may be output based on semantic units of a lower representation by a multi-layer neural network, a recurrent neural network (e.g., a long short-term memory network), and/or a recursive neural network.

Although FIG. 3 depicts a multi-scale matching model in which the first hierarchy of representations 302 and second hierarchy of representations 304 each include three different representations (e.g., representations 310, 320, and 340 in the first hierarchy 302, and representations 340, 350, and 360 in the second hierarchy 304), any suitable number of representations may be used, including in some cases different numbers for each sentence/hierarchy.

Multi-scale matching model 300 may be configured to output the match value based on comparing a selected representation in the first hierarchy to a plurality of representations in the second hierarchy, and further based on comparing a selected representation in the second hierarchy to a plurality of representations in the first hierarchy. In an example, comparing the selected representation in the first hierarchy to a plurality of representations in the second hierarchy includes, for each representation in the second hierarchy to which the selected representation in the first hierarchy is compared, determining a match component for such representation in the second hierarchy and the selected representation in the first hierarchy.

In some examples, the selected representation in each hierarchy is a lowest representation in that hierarchy. In other examples, the selected representation in each hierarchy may be a higher representation in that hierarchy. In some examples, outputting the match value is further based on comparing an additional representation in the first hierarchy or the second hierarchy to one or more of the representations in the other of the first or second hierarchies. Accordingly, the match value may be based on one or more additional match components, determined for each additional representation in the first or second hierarchy and for each representation which is compared to the additional representation(s).

For example, multi-scale matching model 300 includes selecting a lowest representation 310 in the first hierarchy 302, and comparing representation 310 to each representation of the second hierarchy 304 in order to determine the match components. Accordingly, multi-scale matching model may determine match component 370 based on comparing lowest selected representation 310 of the first hierarchy 302 to lowest representation 340 of the second hierarchy 304, determine match component 372 based on comparing lowest selected representation 310 to a higher representation 350 of second hierarchy 304, and determine match component 374 based on comparing lowest selected representation 310 to the highest representation 360 of the second hierarchy 304.

Similarly, comparing the selected representation in the second hierarchy to each of a plurality of representations in the first hierarchy may include, for each representation in the first hierarchy to which the selected representation in the second hierarchy is compared, determining a match component for such representation in the first hierarchy and the selected representation in the second hierarchy. In the depicted example, the selected representation in second hierarchy 304 is a lowest representation 340, and, accordingly, multi-scale matching model may determine match component 370 based on comparing lowest selected representation 340 of the second hierarchy 304 to lowest representation 310 of the first hierarchy 302, determine match component 376 based on comparing lowest selected representation 340 to a higher representation 320 of first hierarchy 302, and determine match component 378 based on comparing lowest selected representation 340 to the highest representation 330 of the first hierarchy 302.

In some examples, a match component computed for a selected representation in the first hierarchy may be the same match component as would be computed for a selected representation in the second hierarchy, e.g., as with match component 370 which may be determined for selected representation 310 in the first hierarchy, and determined in identical fashion for selected representation 340 in the second hierarchy. Accordingly, when a match component would be determined in identical fashion for selected representations in each hierarchy, the match component may be determined once for the first such representation, and determining the match component for the second such representation includes outputting the previously determined match component.

Determining a match component by comparing a first representation in the first hierarchy to a second representation in the second hierarchy may be performed by a match component model configured to compare the first representation to the second representation and to output the match component. For example, determining match component 376 based on comparing representation 320 of first hierarchy 302 to representation 340 of second hierarchy of representations 304 is described below, with regard to FIG. 4.

Accordingly, the match value based on the comparisons may be based on the match components, e.g., match value 380 based on match components 370, 372, 374, 376, and 378. In some examples, the match value may be output by a neural network based on a vector including a concatenation of the match components. The neural network may include trainable parameters, and accordingly, training the multi-scale matching model may include adjusting the trainable parameters of the neural network. The neural network may be based on any suitable neural network architecture, e.g., a multi-layer feed-forward neural network.

In some examples, the match components include a match component representing each comparison of any choice of representation in the first hierarchy 302 to any choice of representation in the second hierarchy 304. In other examples, the match components include match components representing 1) comparisons of a selected representation in the first hierarchy 302 to each representation in the second hierarchy 304, and 2) comparisons of a selected representation in the second hierarchy 304 to each representation in the first hierarchy 302. In other examples, the match components may include a match component for each comparison of any suitable selection of pairs of representations including a first representation from the first hierarchy 302 and a second representation from the second hierarchy 304. Accordingly, the inputs to the neural network may include match components representing any suitable selection of comparisons between representations in the first hierarchy 302 and representations in the second hierarchy 304.

Figure 4:
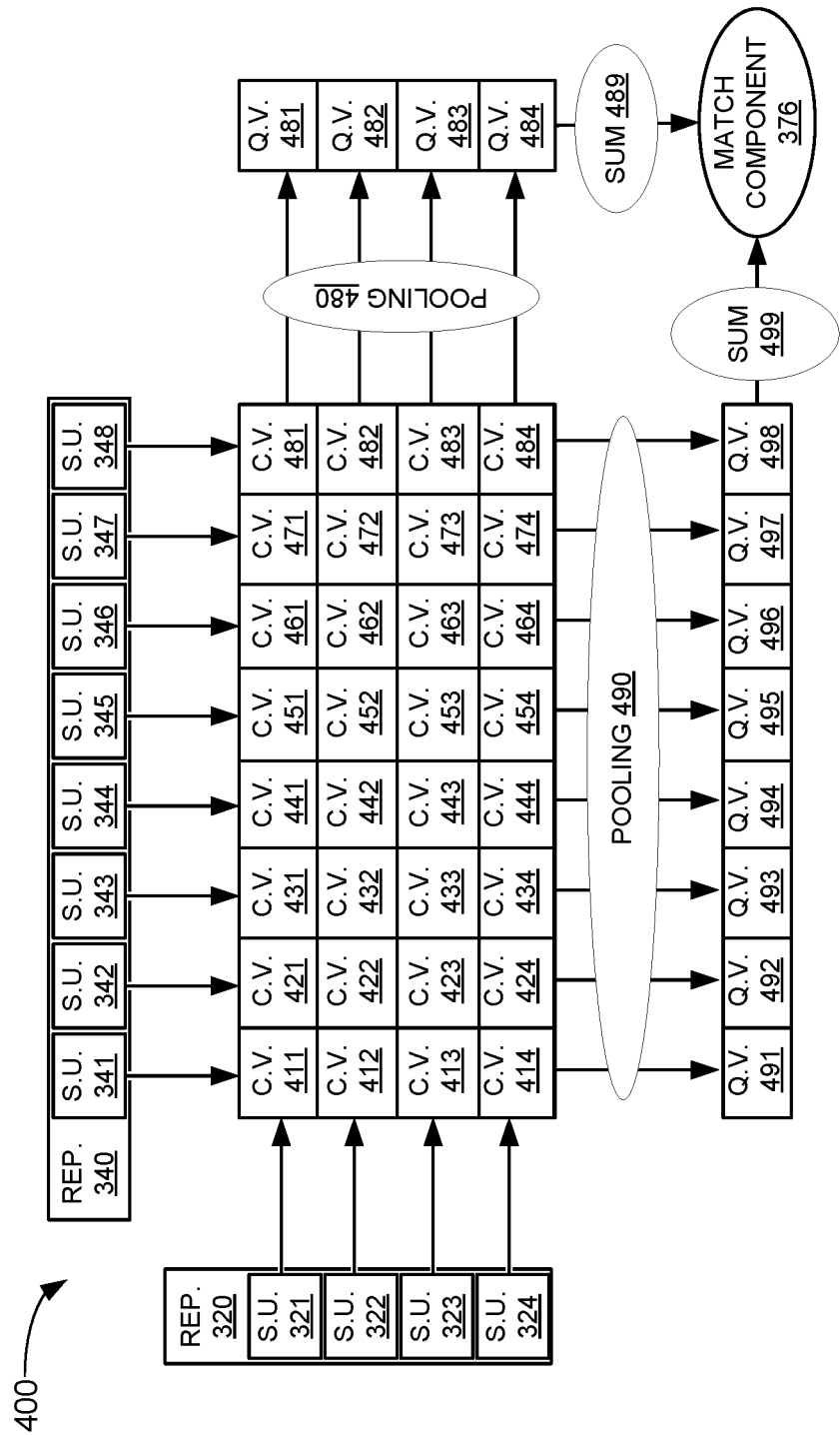
FIG. 4 depicts an example architecture for computing a match component indicating a quality of semantic match between a first representation of a first sentence and a second representation of a second sentence.

FIG. 4 shows a match component model 400 configured to output a match component based on comparing a first representation, in a first hierarchy of representations of a first sentence, to a second representation in a second hierarchy of representations of a second sentence. In particular, FIG. 4 depicts a match component model configured to determine match component 376 based on comparing representation 320 in first hierarchy of representations 302 to representation 340 in second hierarchy of representations 304. Although FIG. 4 depicts match component 376 based on comparing representation 320 to representation 340, a match component model may be configured to compare any representation (e.g., a lowest representation or any higher representation) in hierarchy 302 to any representation in hierarchy 304. Accordingly, a multi-scale matching model (e.g., multi-scale matching model 300) may include a plurality of match components including one match component for each pair of representations being compared by the multi-scale matching model.

Match component model 400 outputs match component 376 based on the one or more semantic units of each representation being compared (e.g., based on semantic units 321-324 of representation 320 in the first hierarchy, and based on semantic units 341-342 of representation 340 in the second hierarchy).

Match component model 400 compares each semantic unit of representation 320 to each semantic unit of representation 340 to produce a plurality of comparison vectors (e.g., comparison vectors 401-404, 411-414, 421-424, 431-434, 441-444, 451-454, 461-464, and 471-474). Each comparison vector represents a comparison between one semantic unit of representation 320 and one semantic unit of representation 340. For example, FIG. 4 depicts the comparison vectors in a tabular fashion, wherein comparison vectors along a row of the table are each associated with a semantic unit in representation 320 along the same row (e.g., with an arrow pointing from the semantic unit towards the row), and wherein comparison vectors along a column of the table are each associated with a semantic unit in representation 340 along the same column (e.g., with an arrow pointing from the semantic unit towards the column).

Accordingly, a particular comparison vector is associated with one semantic unit in representation 320, and with one semantic unit in representation 340. For example, comparison vector 411 is associated with semantic unit 321 of representation 320 and with semantic unit 341 of representation 340. Similarly, comparison vector 434 is associated with semantic unit 324 of representation 320 and with semantic unit 343 of representation 340. A comparison vector for a pair of semantic units may be computed via any suitable function, e.g., by a trainable neural network. Accordingly, adjusting the one or more trainable parameters of a multi-scale matching model may include adjusting trainable parameters of the neural network, e.g., based on the gradient of the objective function J with regard to the trainable parameters of the neural network. Each comparison vector may have any suitable defined number of elements, where the defined number of elements may be the same defined number of elements included in each semantic unit, or a different number. For example, when each semantic unit is a vector having 128 elements, each comparison vector may have a smaller number of elements (e.g., 64), an identical number of elements (e.g., 128), or a greater number of elements (e.g., 152).

Outputting a match component for a first representation 320 in the first hierarchy 302 and a second representation 340 in the second hierarchy may be based on determining a first plurality of quality values representing a one-way match of the first representation 320 to the second representation 340 (e.g., quality values 481-484) and determining a second plurality of quality vectors representing a one-way match of the second representation 340 to the first representation 320 (e.g., quality values 491-498). For a particular one-way match, each quality value indicates a quality of match between a particular semantic unit of the one representation to each semantic unit of the other representation. For example, quality value 481 indicates a quality of match between semantic unit 321 of first representation 320 to each semantic unit of second representation 340 (e.g., semantic units 341-348). Similarly, quality value 492 indicates a quality of match between semantic unit 342 of the second representation 340 and each semantic unit of first representation 320 (e.g., semantic units 321-324).

In some examples, each quality value associated with a target semantic unit in the first hierarchy is produced by pooling based on such target semantic unit and the semantic units of one or more representations in the second hierarchy, and similarly, each quality value associated with a target semantic unit in the second hierarchy is produced by pooling based on such target semantic unit and the semantic units of one of the representations in the first hierarchy. Accordingly, a quality value 481 associated with a target semantic unit 321 in the first hierarchy 302 may represent a quality of match between such target unit 321 and the entire second hierarchy 304. For example, match component model 400 includes a first pooling layer 480 configured to pool based on a target semantic unit in representation 320 and each semantic unit of representation 340, and a second pooling layer 490 configured to pool based on a target semantic unit in representation 340 and each semantic unit of representation 320.

Each pooling layer may be configured to pool comparison vectors associated with a target semantic unit (e.g., comparison vectors each indicating a comparison between the target semantic unit and one semantic unit of the other representation). For example, pooling layer 490 is configured to output quality value 491 by pooling based on comparison vectors associated with semantic unit 341, e.g., comparison vectors 411-414. Pooling layer 490 may pool the comparison vectors 411-414 in an elementwise fashion to produce a quality value 491 comprising a vector having an identical defined number of elements as each comparison vector. Accordingly, each quality value output by pooling layer 490 may be a vector having the defined number of elements.

For example, when pooling layer 490 is based on max pooling, pooling layer 490 may select, for each element of quality vector 491, a highest element among each of the comparison vectors associated with semantic unit 341 (e.g., comparison vectors 411-414). Similarly, pooling layer 480 may output quality values comprising vectors including elements selected based on pooling comparison vectors associated with a semantic unit in representation 320, e.g., quality vector 482 may include elements selected based on max pooling comparison vectors associated with semantic unit 322 (e.g., comparison vectors 412, 422, 432, 442, 452, 462, 472, and 482).

Accordingly, pooling layer 480 is configured to output quality values 481-484, while pooling layer 490 is configured to output quality values 491-498. Match component model 400 is configured to output a representation of the comparison between representation 320 and representation 340 as a match component 376. Match component 376 comprises a concatenation of a first sum vector output by a sum layer 489 and a second sum vector output by a sum layer 499. Sum layer 489 is configured to receive as inputs the quality vectors computed for representation 320 (e.g., quality vectors 481-484 output by pooling layer 480) and to output an elementwise sum of such quality vectors, so that the resulting sum vector has the same number of elements as each quality vector, and so that each element of the resulting sum vector is a sum of corresponding elements of the quality vectors. Similarly, sum layer 499 is configured to output a sum vector based on the quality vectors computed for representation 340. Accordingly, match component model 400 is configured to concatenate together the two sum vectors to make a concatenated vector, and to output the concatenated vector as match component 376.

In some embodiments, the methods and processes described herein (e.g., method 100 and method 200) may be tied to a computing system of one or more computing devices. In particular, such methods and processes may be implemented as a computer-application program or service, an application-programming interface (API), a library, and/or other computer-program product.

Figure 5:
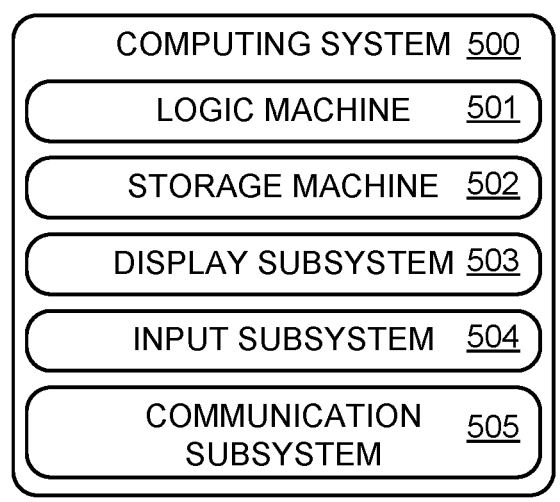
FIG. 5 depicts an exemplary computing device that may be used to enact the semantic matching described herein.

FIG. 5 schematically shows a non-limiting embodiment of a computing system 500 that can enact one or more of the methods and processes described above. Computing system 500 is shown in simplified form. Computing system 500 may take the form of one or more personal computers, server computers, tablet computers, home-entertainment computers, network computing devices, gaming devices, mobile computing devices, mobile communication devices (e.g., smart phone), and/or other computing devices.

Computing system 500 includes a logic machine 501 and a storage machine 502. Computing system 500 may optionally include a display subsystem 503, input subsystem 504, communication subsystem 505, and/or other components not shown in FIG. 5.

Logic machine 501 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 502 includes one or more physical devices configured to hold instructions executable by the logic machine to implement the methods and processes described herein. When such methods and processes are implemented, the state of storage machine 502 may be transformed—e.g., to hold different data.

Storage machine 502 may include removable and/or built-in devices. Storage machine 502 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 502 may include volatile, nonvolatile, dynamic, static, read/write, read-only, random-access, sequential-access, location-addressable, file-addressable, and/or content-addressable devices.

It will be appreciated that storage machine 502 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 501 and storage machine 502 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 500 implemented to perform a particular function. In some cases, a module, program, or engine may be instantiated via logic machine 501 executing instructions held by storage machine 502. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 503 may be used to present a visual representation of data held by storage machine 502. This visual representation may take the form of a graphical user interface (GUI). As the herein described methods and processes change the data held by the storage machine, and thus transform the state of the storage machine, the state of display subsystem 503 may likewise be transformed to visually represent changes in the underlying data. Display subsystem 503 may include one or more display devices utilizing virtually any type of technology. Such display devices may be combined with logic machine 501 and/or storage machine 502 in a shared enclosure, or such display devices may be peripheral display devices.

When included, input subsystem 504 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 505 may be configured to communicatively couple computing system 500 with one or more other computing devices. Communication subsystem 505 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 500 to send and/or receive messages to and/or from other devices via a network such as the Internet.

In an example, a method for estimating a quality of semantic match of a first sentence to a second sentence comprises: outputting a first hierarchy of representations of the first sentence at increasing degrees of semantic compression; outputting a second hierarchy of representations of the second sentence at increasing degrees of semantic compression; comparing a selected representation in the first hierarchy to each of a plurality of representations in the second hierarchy; comparing a selected representation in the second hierarchy to each of a plurality of representations in the first hierarchy; and outputting a match value indicating a quality of semantic match between the first sentence and the second sentence, the match value based at least on the comparisons. In this example or any other example, for each representation in the first and second hierarchies of representations, such representation includes a plurality of semantic units; for a lowest representation in each of the first and second hierarchies of representations, each semantic unit of such lowest representation corresponds to a word; and for each representation in each of the first and second hierarchies of representations that is higher than the lowest representation, each semantic unit in such higher representation corresponds to multiple words. In this example or any other example, the first sentence is a question text; the second sentence is one of a plurality of candidate answer texts; the match value indicating a quality of semantic match between the first sentence and the second sentence is one of a plurality of similarly-generated candidate match values, each candidate match value indicating a quality of semantic match between the question text and a candidate answer text of the plurality of candidate answer texts; and the method further comprises outputting a candidate answer text associated with a highest candidate match value among the candidate match values. In this example or any other example, comparing the selected representation in the first hierarchy to each of a plurality of representations in the second hierarchy includes, for each representation in the second hierarchy to which the selected representation in the first hierarchy is compared, determining a match component for such representation in the second hierarchy and the selected representation in the first hierarchy; and comparing the selected representation in the second hierarchy to each of a plurality of representations in the first hierarchy includes, for each representation in the first hierarchy to which the selected representation in the second hierarchy is compared, determining a match component for such representation in the first hierarchy and the selected representation in the second hierarchy; and the match value is based on the match components. In this example or any other example, for each representation in the second hierarchy to which the selected representation in the first hierarchy is compared, the associated match component is based on quality values associated with target semantic units of the selected representation in the first hierarchy, each quality value indicating a quality of match between such target semantic unit in the selected representation in the first hierarchy and the semantic units of the representation in the second hierarchy; and for each representation in the first hierarchy to which the selected representation in the second hierarchy is compared, the associated match component is based on quality values associated with target semantic units of the selected representation in the second hierarchy, each quality value indicating a quality of match between such target semantic unit in the selected representation in the first hierarchy and the semantic units of the representation in the second hierarchy. In this example or any other example, each quality value associated with a target semantic unit in the first hierarchy is produced by pooling based on such target semantic unit and the semantic units of one of the representations in the second hierarchy; and each quality value associated with a target semantic unit in the second hierarchy is produced by pooling based on such target semantic unit and the semantic units of one of the representations in the first hierarchy. In this example or any other example, outputting the match value is further based on comparing an additional representation in the first hierarchy or the second hierarchy to one or more of the representations in the other of the first and second hierarchies.

In an example, a method for training a discriminator to estimate quality of semantic match between sentences comprises: training a discriminator configured to output, for a pair of sentences, a match value indicating a quality of semantic match between the pair of sentences, wherein training the discriminator includes (1) training the discriminator on positive sentence pairs, and (2) training the discriminator on negative sentence pairs; and operating a generator configured to select and provide negative sentence pairs to the discriminator for training, wherein such selection of negative sentence pairs includes (1) for each candidate negative sentence pair of a plurality of candidate negative sentence pairs, outputting a match value indicating a quality of semantic match between sentences of the candidate negative sentence pair, and (2) selecting one of the candidate negative sentence pairs for training the discriminator based on the match value for that candidate negative sentence pair. In this example or any other example, selecting the candidate negative sentence pair based on the match value for that candidate negative sentence pair includes favoring candidate negative sentence pairs having relatively higher match values. In this example or any other example, selecting the candidate negative sentence pair based on the match value for that candidate negative sentence pair includes randomly selecting a negative sentence pair from the plurality of candidate negative sentence pairs, such random selection being probabilistically weighted based on match values for the plurality of candidate negative sentence pairs. In this example or any other example, the plurality of candidate negative sentence pairs is constructed based on pairing a target sentence with each sentence of a plurality of other sentences, wherein none of the plurality of other sentences is included in a positive sentence pair with the target sentence. In this example or any other example, training the discriminator on a positive sentence pair includes adjusting one or more trainable parameters of the discriminator to increase a match value output by the discriminator for the positive sentence pair; and training the discriminator on a negative sentence pair includes adjusting the one or more trainable parameters of the discriminator to decrease a match value output by the discriminator for the negative sentence pair. In this example or any other example, the method further comprises training the generator, wherein training the generator includes: providing a negative sentence pair to the discriminator; based on a match value output by the discriminator for the negative sentence pair, adjusting one or more trainable parameters of the generator to increase a likelihood that a future negative sentence pair selected by the generator will cause the discriminator to output a higher match value for such negative sentence pair. In this example or any other example, outputting, via either the discriminator or the generator, a match value for a pair of sentences including a first sentence and a second sentence includes: outputting a first hierarchy of representations of the first sentence at increasing degrees of semantic compression; outputting a second hierarchy of representations of the second sentence at increasing degrees of semantic compression; comparing a selected representation in the first hierarchy to each of a plurality of representations in the second hierarchy; comparing a selected representation in the second hierarchy to each of a plurality of representations in the first hierarchy; and outputting a match value indicating a quality of semantic match between the first sentence and the second sentence, the match value based at least on the comparisons. In this example or any other example, the method further comprises: for each candidate answer text of a plurality of candidate answer texts, operating the discriminator to output a candidate match value indicating a quality of semantic match between a question text and the candidate answer text; and outputting a candidate answer text associated with a highest candidate match value among the candidate match values.

In an example, a computer system for estimating a quality of semantic match of a first sentence to a second sentence comprises: a logic machine; and a storage machine configured to hold instructions executable by the logic machine to: output a first hierarchy of representations of the first sentence at increasing degrees of semantic compression; output a second hierarchy of representations of the second sentence at increasing degrees of semantic compression; compare a selected representation in the first hierarchy to each of a plurality of representations in the second hierarchy; compare a selected representation in the second hierarchy to each of a plurality of representations in the first hierarchy; and output a match value indicating a quality of semantic match between the first sentence and the second sentence, the match value based at least on the comparisons. In this example or any other example, for each representation in the first and second hierarchies of representations, such representation includes a plurality of semantic units; for a lowest representation in each of the first and second hierarchies of representations, each semantic unit of such lowest representation corresponds to a word; and for each representation in each of the first and second hierarchies of representations that is higher than the lowest representation, each semantic unit in such higher representation corresponds to multiple words. In this example or any other example, comparing the selected representation in the first hierarchy to each of a plurality of representations in the second hierarchy includes, for each representation in the second hierarchy to which the selected representation in the first hierarchy is compared, determining a match component for such representation in the second hierarchy and the selected representation in the first hierarchy; and comparing the selected representation in the second hierarchy to each of a plurality of representations in the first hierarchy includes, for each representation in the first hierarchy to which the selected representation in the second hierarchy is compared, determining a match component for such representation in the first hierarchy and the selected representation in the second hierarchy; and the match value is based on the match components. In this example or any other example, the first sentence is a question text; the second sentence is one of a plurality of candidate answer texts; the match value indicating a quality of semantic match between the first sentence and the second sentence is one of a plurality of similarly-generated candidate match values, each candidate match value indicating a quality of semantic match between the question text and a candidate answer text of the plurality of candidate answer texts; and the instructions are further executable to output a candidate answer text associated with a highest candidate match value among the candidate match values. In this example or any other example, outputting the match value is further based on comparing an additional representation in the first hierarchy or the second hierarchy to one or more of the representations in the other of the first and second hierarchies.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for applying a trained machine learning model to answer a user query, comprising:
receiving a query text from a user;
receiving a previously-trained discriminator configured to output, for a pair of sentences, a match value indicating a quality of semantic match between the pair of sentences;
for each candidate answer text of a plurality of candidate answer texts, operating the previously-trained discriminator to output a candidate match value for the query text and the candidate answer text based on comparing a first hierarchy of representations of the query text at increasing degrees of semantic compression to a second hierarchy of representations of the candidate answer text at increasing degrees of semantic compression; and
outputting an answer text associated with a highest candidate match value among candidate match values.

2. The method of claim 1, wherein comparing the first hierarchy of representations to the second hierarchy of representations includes comparing a selected representation in the first hierarchy to each of a plurality of representations in the second hierarchy.

3. The method of claim 2, wherein:
comparing the selected representation in the first hierarchy to each of a plurality of representations in the second hierarchy includes, for each representation in the second hierarchy to which the selected representation in the first hierarchy is compared, determining a match component for such representation in the second hierarchy and the selected representation in the first hierarchy;
comparing the selected representation in the second hierarchy to each of a plurality of representations in the first hierarchy includes, for each representation in the first hierarchy to which the selected representation in the second hierarchy is compared, determining a match component for such representation in the first hierarchy and the selected representation in the second hierarchy; and
the match value is based on the match components.

4. The method of claim 3, wherein:
for each representation in the second hierarchy to which the selected representation in the first hierarchy is compared, the associated match component is based on quality values associated with target semantic units of the selected representation in the first hierarchy, each quality value indicating a quality of match between such target semantic unit in the selected representation in the first hierarchy and the semantic units of the representation in the second hierarchy; and
for each representation in the first hierarchy to which the selected representation in the second hierarchy is compared, the associated match component is based on quality values associated with target semantic units of the selected representation in the second hierarchy, each quality value indicating a quality of match between such target semantic unit in the selected representation in the first hierarchy and the semantic units of the representation in the second hierarchy.

5. The method of claim 2, wherein comparing the first hierarchy of representations to the second hierarchy of representations further includes comparing a selected representation in the second hierarchy to each of a plurality of representations in the first hierarchy.

6. The method of claim 2, wherein comparing the first hierarchy of representations to the second hierarchy of representations further includes comparing an additional representation in the first hierarchy or the second hierarchy to one or more of the representations in the other of the first and second hierarchies.

7. The method of claim 1, wherein:
for each representation in the first and second hierarchies of representations, such representation includes a plurality of semantic units;
for a lowest representation in each of the first and second hierarchies of representations, each semantic unit of such lowest representation corresponds to a word; and for each representation in each of the first and second hierarchies of representations that is higher than the lowest representation, each semantic unit in such higher representation corresponds to multiple words.

8. A method for applying a trained machine learning model to answer a user query, comprising:
receiving a query text from a user;
receiving a previously-trained discriminator configured to output, for a pair of sentences, a match value indicating a quality of semantic match between the pair of sentences, wherein such previous training includes training the discriminator on positive sentence pairs and training the discriminator on negative sentence pairs provided by a generator;
for each candidate answer text of a plurality of candidate answer texts, operating the previously-trained discriminator to output a candidate match value for the query text and the candidate answer text; and
outputting a candidate answer text associated with a highest candidate match value among the candidate match values.

9. The method of claim 8, wherein the generator is configured to provide a negative sentence pair by selecting the negative sentence pair from a plurality of candidate negative sentence pairs, based at least on assessing a match value for the negative sentence pair.

10. The method of claim 9, wherein the generator is configured to select a negative sentence pair having a relatively higher match value for the negative sentence pair relative to other candidate negative sentence pairs.

11. The method of claim 9, wherein the generator is configured to randomly select a negative sentence pair from the plurality of candidate negative sentence pairs, such random selection being probabilistically weighted based on match values for the plurality of candidate negative sentence pairs.

12. The method of claim 9, wherein the plurality of candidate negative sentence pairs is constructed based on pairing a target sentence with each sentence of a plurality of other sentences, wherein none of the plurality of other sentences is included in a positive sentence pair with the target sentence.

13. The method of claim 8, wherein:
training the discriminator on a positive sentence pair includes adjusting one or more trainable parameters of the discriminator to increase a match value output by the discriminator for the positive sentence pair; and
training the discriminator on a negative sentence pair includes adjusting the one or more trainable parameters of the discriminator to decrease a match value output by the discriminator for the negative sentence pair.

14. The method of claim 8, further comprising training the generator, wherein training the generator includes:
providing a negative sentence pair to the discriminator; and
based on a match value output by the discriminator for the negative sentence pair, adjusting one or more trainable parameters of the generator to increase a likelihood that a future negative sentence pair selected by the generator will cause the discriminator to output a higher match value for such negative sentence pair.

15. The method of claim 8, further comprising:
for each candidate answer text of a plurality of candidate answer texts, operating the discriminator to output a candidate match value indicating a quality of semantic match between a question text and the candidate answer text; and
outputting a candidate answer text associated with a highest candidate match value among the candidate match values.

16. A computer system for estimating a quality of semantic match of a first sentence to a second sentence, comprising:
a logic machine; and
a storage machine configured to hold instructions executable by the logic machine to:
receive a user text from a user;
receive a previously-trained discriminator configured to output, for a pair of sentences, a match value indicating a quality of semantic match between the pair of sentences;
for each candidate answer text of a plurality of candidate answer texts, operate the previously-trained discriminator to output a candidate match value indicating a quality of semantic match between the query text and the candidate answer text based on comparing a first hierarchy of representations of the query text at increasing degrees of semantic compression to a second hierarchy of representations of the candidate answer text at increasing degrees of semantic compression; and
output an answer text associated with a highest candidate match value among the candidate match values.

17. The computer system of claim 16, wherein:
for each representation in the first and second hierarchies of representations, such representation includes a plurality of semantic units;
for a lowest representation in each of the first and second hierarchies of representations, each semantic unit of such lowest representation corresponds to a word; and
for each representation in each of the first and second hierarchies of representations that is higher than the lowest representation, each semantic unit in such higher representation corresponds to multiple words.

18. The computer system of claim 17, wherein:
comparing the selected representation in the first hierarchy to each of a plurality of representations in the second hierarchy includes, for each representation in the second hierarchy to which the selected representation in the first hierarchy is compared, determining a match component for such representation in the second hierarchy and the selected representation in the first hierarchy;
comparing the selected representation in the second hierarchy to each of a plurality of representations in the first hierarchy includes, for each representation in the first hierarchy to which the selected representation in the second hierarchy is compared, determining a match component for such representation in the first hierarchy and the selected representation in the second hierarchy; and
the match value is based on the match components.

19. The computer system of claim 16, wherein:
the first sentence is a question text;
the second sentence is one of a plurality of candidate answer texts;
the match value indicating a quality of semantic match between the first sentence and the second sentence is one of a plurality of similarly-generated candidate match values, each candidate match value indicating a quality of semantic match between the question text and a candidate answer text of the plurality of candidate answer texts; and the instructions are further executable to output a candidate answer text associated with a highest candidate match value among the candidate match values.

20. The computer system of claim 16, wherein outputting the match value is further based on comparing an additional representation in the first hierarchy or the second hierarchy to one or more of the representations in the other of the first and second hierarchies.

\* \* \* \* \*